(No Model.)
W. E. ELLIOTT.
BEARING FOR JOURNALS.
No. 402,009. Patented Apr. 23, 1889.
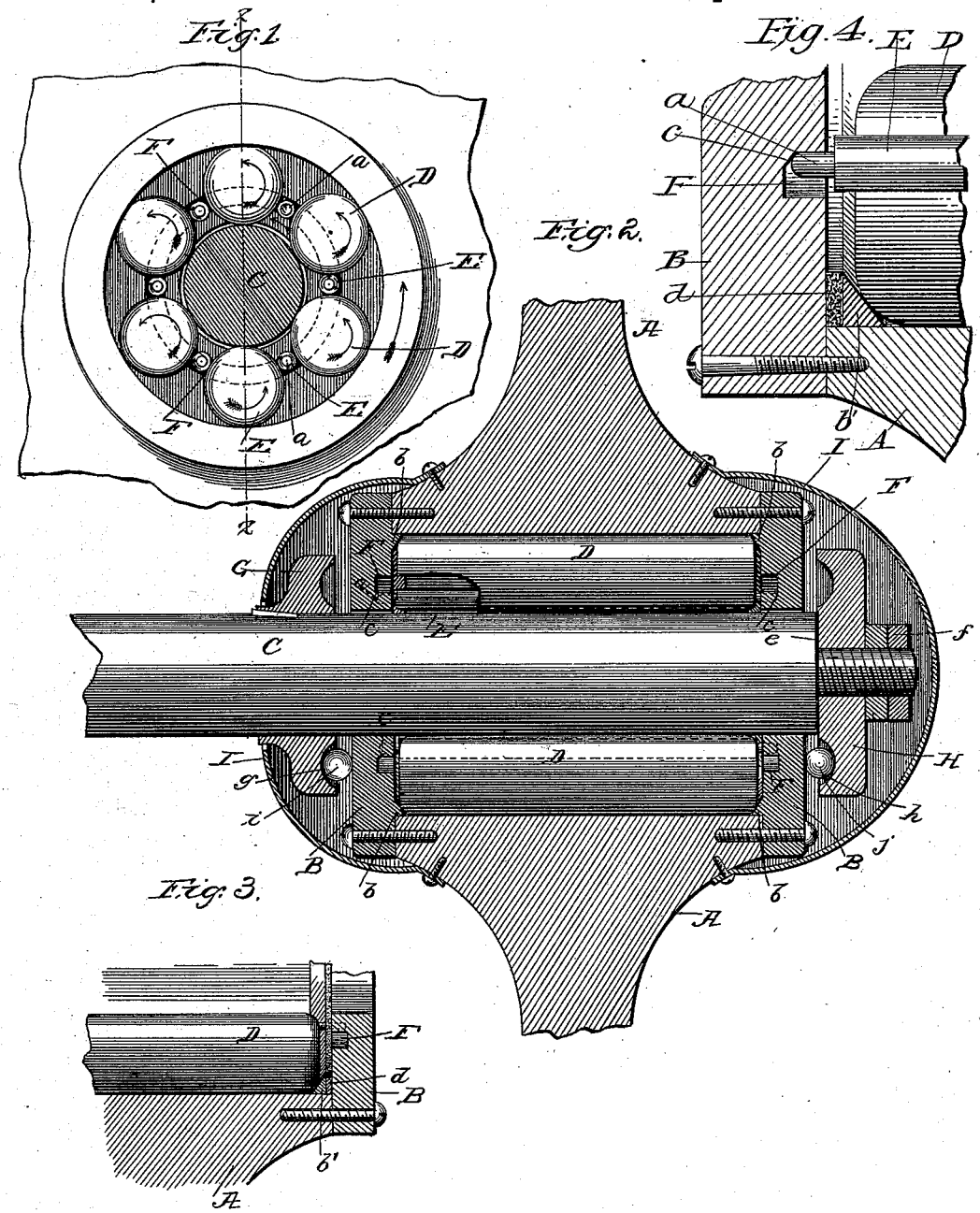
Witnesses
Wm. Rheem
Wall R. Onohundro
Inventor
William E. Elliott
By Jno. G. Elliott
Atty.

UNITED STATES PATENT OFFICE.

WILLIAM E. ELLIOTT, OF CHICAGO, ILLINOIS.

BEARING FOR JOURNALS.

SPECIFICATION forming part of Letters Patent No. 402,009, dated April 23, 1889.

Application filed May 5, 1888. Serial No. 272,881. (No model.)

*To all whom it may concern:*

Be it known that I, WILLIAM E. ELLIOTT, a citizen of the United States, residing in the city of Chicago, county of Cook, and State of Illinois, have invented certain new and useful Improvements in Bearings for Journals, Axles, &c., of which the following is a specification.

This invention relates to improvements in bearings for journals, axles, &c., in which the journal or axle, as the case may be, is surrounded by a series of journal or axle bearing cylinders, each separated from the other by cylinders free to revolve on their own axes and about the axis of the journal. My invention, however, is hereinafter described in its application to the hub of a wheel revolving freely on its axle or journal, in which case the journal-box, which is the hub, has a rotary movement about the axle, which axle may be either fixed or loose, as desired, but is usually fixed, and will hereinafter be so described.

The objects of my invention are to as nearly as possible eliminate friction between a hub or box and the axle, and between the ends of said hub or box and the shoulders or collars maintaining it in its operative position on the axle, and in so doing diminish the wear of the several parts and prevent both a lateral and end thrust of the hub against the axle.

A further object is to have the contacting surfaces of all of the anti-friction devices—that is to say, the bearing-cylinders, the separating-cylinders, and the hub—travel with the same relative velocity and in the same direction, notwithstanding the difference in the diameters of said cylinders and their orbits about the axle, whereby all resisting, sliding, or grinding of either of said devices upon each other or upon their bearings is avoided, and all of the cylinders are maintained in the same relative radial positions upon the axle during their travel about the same.

A still further object is to have between the ends of the hub and the shoulders or collars maintaining the hub on the axle anti-friction devices of such a character as will prevent an end-thrust of the hub and maintain the bearing-surfaces uniform throughout their length on the axle, and at the same time oppose a minimum surface of bearing to the hub ends and to said collars or shoulders.

Still further objects are to have the inclined bearings for the ends of the axle-bearing cylinders of such a character as to prevent friction between the squared ends of said cylinders and the box; also, to maintain the axle-bearing cylinders from any sudden endwise or other movement tending to cause them to wedge in their end bearings or between the axle and the hub, and also to have said inclined bearings yielding in such a manner that a sudden endwise movement or thrust of the axle-bearing cylinders can cause no injury to said cylinders; finally, to provide certain details of construction promoting the simplicity and durability of and accessibility to the several parts of such an anti-friction device.

These several objects and others hereinafter described are attained by the devices illustrated in the accompanying drawings, in which—

Figure 1 represents an end elevation of a hub embodying my invention, with the end plate of the hub removed and the web of the wheel broken away; Fig. 2, an enlarged longitudinal section of the same on the line 2 2 of Fig. 1, with the axle and cylinders shown in elevation; Fig. 3, a detail longitudinal sectional view of the hub or box, illustrating a modified form of the inclined bearing for the ends of the journal-bearing cylinders; Fig. 4, an enlarged detail section similar to Fig. 3, but more particularly showing the contracted journal and bearing of the separating-cylinders.

Similar letters of reference indicate the same parts in the several figures of the drawings.

In carrying out this invention the hub A may be that of an ordinary vehicle or car-wheel, but with a bore considerably larger than the diameter of the axle—that is to say, the diameter of the axle plus at least twice the diameter of one of the axle-bearing cylinders. Secured to the ends of the hubs by bolts or other suitable means are bearing-plates B, through central perforations in which loosely projects the axle C, the said bearing-plates being provided with inclined bearings $b$, formed by shoulders or annular flanges, which project into the hub, and are inclined on their faces opposing axle-bearing cylinders D, surrounding the axle.

The cylinders D bear against the axle and the hub, and are free to rotate around the axle and with the hub independently of both of said members, and are shorter than the inside length of the hub. These axle-bearing cylinders are separated from each other by separating-cylinders E, which, as shown, have a uniform bearing the length of the bearing-cylinders, and terminate in journals $a$, contracted to a less diameter than that of their body, which journals bear against the inner walls of annular grooves F, formed in the end plates of the hub and surrounding the axle.

The inner and bearing walls of the annular grooves F are within the circle of the axis of rotation of the bearing-cylinders D, and far enough within said circle to maintain the circle of the axis of rotation or orbit of the separating-cylinders within the circle of the axis of rotation of the bearing-cylinders.

As a result of having the orbit of the separating-cylinders about the axle within the orbit traversed by the axes of the axle-bearing cylinders around the axle, said separating-cylinders are caused to revolve and travel on their bearing in the annular groove in an opposite direction to their forward travel; but as they bear upon a wall of a groove in the bearing-plate which travels forward, and as hereinafter shown, as fast as they rotate backward, the bearing-cylinders from which they get their rotary motion may cause them to travel about the axle without friction between said cylinders, or between the separating-cylinders and their bearings. The above result, however, could not be accomplished if the separating-cylinders and their journals were of equal diameter, for the velocity of the bearing or contacting surface of said journals on their bearings would be just equal to that of the inside surface of the hub, and as the circumference of the circle formed by the inner wall of the annular groove is less than the circumference of the bore of the hub a sliding movement of the journals of the separating-cylinders upon their bearings would result, thereby creating friction. I have discovered, however, that this objection may be avoided by maintaining the proper proportion between the diameter of said separating-cylinders and the diameter of their journals, the proper proportion being the same as the proportion between the diameter of the bore of the hub and the diameter of the circle formed by the inside wall of the annular groove. With these differences in diameter the hub-bearing wall and the contacting surfaces of the bearing and separating cylinders in traversing the axle will travel with precisely the same relative velocity and make the circle of the axle in precisely the same time as do the journals of the separating-cylinders in their bearings in the annular groove, notwithstanding that the hub-walls have farther to travel, and that the main body of the separating-cylinders are revolved by axle-bearing cylinders of greater diameter than said separating-cylinders and moving at a velocity conforming to the velocity of the hub-bearing cylinders, for the contacting surfaces of the journals of said separating-cylinders and the bearing-wall of the annular groove likewise travel with the same velocity relative to each other, and in the same direction as the hub and bearing-cylinders. As a result of this uniformity in the velocity and time of the hub and the bearing and separating cylinders in traversing the axle, both sets of cylinders have at all times a positive forward movement and rotation around the axle, and except friction by contact they exert no resistance to the axial rotation or forward movement of the axle-bearing cylinders about the axle.

From the above it will be understood that the relative arrangement of these separating-cylinders to the axle-bearing cylinders, and the relative diameter of the journals of the separating-cylinders to the body of said separating-cylinders, and the diameter of the bearing of surface of the annular groove to the diameter of the hub, is such that, although the separating-cylinders revolve in a direction opposite to their forward travel around the axle, the bearing thereof in the hub moves forward just as fast as they revolve backward, and hence no frictional resistance occurs in the rotation of the hub about the axle, the forward movement of the bearing-cylinders about the axle serving to revolve and move the separating-cylinders in their orbit without friction between the bearing and separating cylinders or the separating-cylinders and their bearing in the hub.

As shown, the depth of the annular groove is greater than the diameter of the journals working therein, for the purpose of enabling the separating-cylinders to adjust themselves to any possible wear of either the axle bearing or separating cylinders; but this feature of construction is not an essential element of my present invention.

The features of construction so far described produce an operative device embracing my invention in its broadest sense, and while other features now to be described are both novel and important they are not a limitation in any sense upon claims hereinafter made, except when specifically mentioned therein.

As shown in the drawings, the cylinders D have the corners of their ends rounded and opposing inclined bearings $b$ in the end plates of the hub, which bearings prevent any tendency of the cylinders toward an injurious endwise movement, and at the same time promote a uniformity of bearing between the surface of the cylinders and the axle and hub. The inner walls of the annular grooves F are also preferably likewise inclined, as shown at c, for the purposes of maintaining a uniform bearing of the separating-cylinders on the axle-bearing cylinders and preventing an endwise movement of the separating-cylinders, which to these ends are preferably rounded at their ends in the same manner as the axle-bearing cylinders; but, as before stated, the rounding of the separating and bearing cylinders and the incline of the bearings therefor may be omitted without a substantial departure from my invention, as hereinbefore described.

In the use of inclined bearings, however, or axle or journal bearing cylinders of this general class, and as heretofore constructed, there is a rigid resistance to the endwise movement of the cylinders, which is objectionable, because of a hammering effect tending to batter the cylinder and the bearing, and, besides, permitting an objectionable, quick, and sudden stroke of the cylinders. However, in my present invention, as illustrated in Fig. 3, these objections are avoided by having the inclined bearings b' formed separate from the hub or journal-box heads, and interposing between said inclined bearings and hubs rubber or other elastic or spring washers or gaskets, d, whereby the inclined bearings are cushioned against the endwise movement of the cylinders and a hammering blow thereof to such an extent as to destroy any rigid resistance of the inclined bearings.

In order to maintain the hub in its operative position on the axle, it is confined between a fixed collar, G, which in effect is a shoulder upon the axle, and a removable collar or nut, H, at the outer end of the axle, which nut, preferably as shown, is screwed on a reduced portion of the axle and held against the shoulder e thereby formed, by means of locking-nuts f, the distance between the collars G and H being somewhat greater than the length of the hub. The inner faces of the confining-collars are provided with annular grooves g h, respectively, and in these grooves, and bearing against the heads or end plates of the hubs, are balls i j, respectively, the diameter of which balls is preferably considerably less than that of the arc of the circle transversely through said grooves. These balls bridge the space between the annular grooves and the heads of the hub against the plain faces of which they bear, and therefore permit no endwise movement of the hub on the axle, although said hub is perfectly free to turn thereon.

While it will be no substantial departure from my invention to use two or more balls at the ends of the hub, I prefer and consider as an important element of my invention the employment of a single ball at each end, for the reason that they fulfill the requirements in the maintaining of the hub from an endwise movement and can exert no friction except at their contact-points with the collars and hub end plates, and are therefore not subject to a grinding friction necessarily following the employment of more than one ball in each annular groove and the additional friction produced by the contact of said balls with the hub end plates and collars; and so, also, while it would be no substantial departure from my invention to have the grooves in cross-section more nearly conforming to the circle of the balls, or even V-shaped in cross-section, they are preferably made on an arc of a circle much larger than the balls, in order to reduce to a minimum their frictional contact with the grooves, and for the further reason that the line of frictional contact is reduced to a straight and narrow line parallel with the axis of the hub.

In order to exclude as nearly as possible foreign matters and conceal the several parts of my anti-friction hub, caps I are secured to each end of the hub, either by means of nuts, as shown, or by screwing them thereon.

Among the important advantages of my invention other than the reduction of friction are, that while the hub may be said to be practically tightly clamped to the axle both against a lateral and endwise movement, it is perfectly free to revolve thereon, and in this connection it may be added that the closer the hub is fitted to the axle the more freely it will turn and the less the wear and the more uniform the wear of the several parts, including the axle co-operating therewith.

Having described my invention, what I claim, and desire to secure by Letters Patent, is—

1. In an anti-friction bearing, the combination of a box having in its ends annular grooves provided with inclined bearings, a series of bearing-cylinders, and a series of separating-cylinders, said separating-cylinders being provided with contracted journals having rounded ends engaging said inclined bearing in and free to traverse the annular groove, the circle traversed by the journals of the separating-cylinders being within the corresponding circle of the journal-bearing cylinders, substantially as described.

2. In an anti-friction bearing, the combination of a box having in its ends inclined bearings, and also annular grooves, a series of bearing-cylinders having rounded corners engaging said inclined bearings, and a series of separating-cylinders provided with contracted journals projecting in and free to traverse the annular grooves, the circle traversed by the journals of the separating-cylinders being within the corresponding circle of the journal-bearing cylinders, substantially as described.

3. In an anti-friction bearing, the combination of a box having at its ends inclined bearings, and also annular grooves having similar bearings, and a series of bearing and separating cylinders having rounded corners respectively engaging said inclined bearings, said separating-cylinders being provided with contracted journals projecting in and free to traverse the annular groove, the circle traversed by the journals of the separating-cylinders being within the corresponding circle of the journal-bearing cylinders, substantially as described.

WILLIAM E. ELLIOTT.

In presence of—
ALBERT M. BENNETT,
JNO. G. ELLIOTT.